United States Patent [19]
Stewart et al.

[11] Patent Number: 5,273,490
[45] Date of Patent: * Dec. 28, 1993

[54] ABRASION-RESISTANT PROTECTIVE COVER

[75] Inventors: Todd B. Stewart, Troy; Daniel G. Yurgaites, Auburn, both of Mich.

[73] Assignee: International Sales & Engineering, Inc., Southfield, Mich.

[*] Notice: The portion of the term of this patent subsequent to Sep. 8, 2009 has been disclaimed.

[21] Appl. No.: 683,231

[22] Filed: Apr. 10, 1991

[51] Int. Cl.$^5$ .................... F16D 3/84; F16J 15/52
[52] U.S. Cl. .................... 464/173; 277/212 FB; 464/175
[58] Field of Search .................... 464/173, 174, 175; 277/212 FB; 403/50, 51

[56] References Cited

U.S. PATENT DOCUMENTS

| | | | |
|---|---|---|---|
| 830,203 | 9/1906 | Bogart | 464/38 |
| 1,885,121 | 11/1932 | Loweke | 403/51 X |
| 1,922,431 | 8/1933 | Geyer | 464/175 |
| 1,982,445 | 11/1934 | Miquelon | 464/173 |
| 2,025,635 | 12/1935 | Bishoff | 464/173 |
| 2,085,284 | 6/1937 | Wollner | 464/173 |
| 2,134,358 | 10/1938 | Crossland | 464/173 |
| 2,378,046 | 6/1945 | Stergis | 464/175 XR |
| 2,431,300 | 11/1947 | Quinn | 74/606 R |
| 3,032,812 | 5/1962 | Van Riper | 277/212 R |
| 3,211,019 | 10/1965 | Roach et al. | 464/173 X |
| 3,381,987 | 5/1968 | Husen | 277/212 FB |
| 3,954,027 | 5/1976 | Söderberg et al. | 277/212 FB |
| 4,813,913 | 3/1989 | Belter | 464/175 X |
| 4,836,080 | 6/1989 | Kite, III et al. | 87/9 |
| 5,006,376 | 4/1991 | Arima et al. | 277/212 FB |
| 5,145,191 | 9/1992 | Stewart et al. | 464/175 X |

FOREIGN PATENT DOCUMENTS

| | | | |
|---|---|---|---|
| 18328 | 7/1935 | Australia | 464/175 |
| 2591301 | 6/1987 | France | |
| 57-171124 | 10/1982 | Japan | |
| 261719 | 11/1987 | Japan | 464/175 |
| 625099 | 6/1949 | United Kingdom | 464/173 |
| 1587400 | 4/1981 | United Kingdom | 277/212 FB |

Primary Examiner—Daniel P. Stodolo
Assistant Examiner—William G. Battista, Jr.
Attorney, Agent, or Firm—Basile and Hanlon

[57] ABSTRACT

An abrasion-resistant protective cover, in the form of a sock, fitting over a drive axle joint seal of a vehicle. The sock is formed of abrasion-resistant material to extend the operation of the seal by extending the amount of wear and tear that the seal can withstand. The sock may be pre-assembled about the joint seal during assembly of the drive axle shaft and joint. The sock is attached at one end to the drive axle shaft and at the opposite end to the joint. The sock may also be assembled about the joint seal after assembly of the drive axle shaft and joint. The sock is wrapped about the joint seal and held in place by clamps around the drive axle shaft and the joint. The sock may be fabricated with any one of several abrasion-resistant materials and may include a flexible material to allow the sock to be tightly fitted about the joint seal without limiting movement of the joint seal around the drive axle shaft.

5 Claims, 2 Drawing Sheets

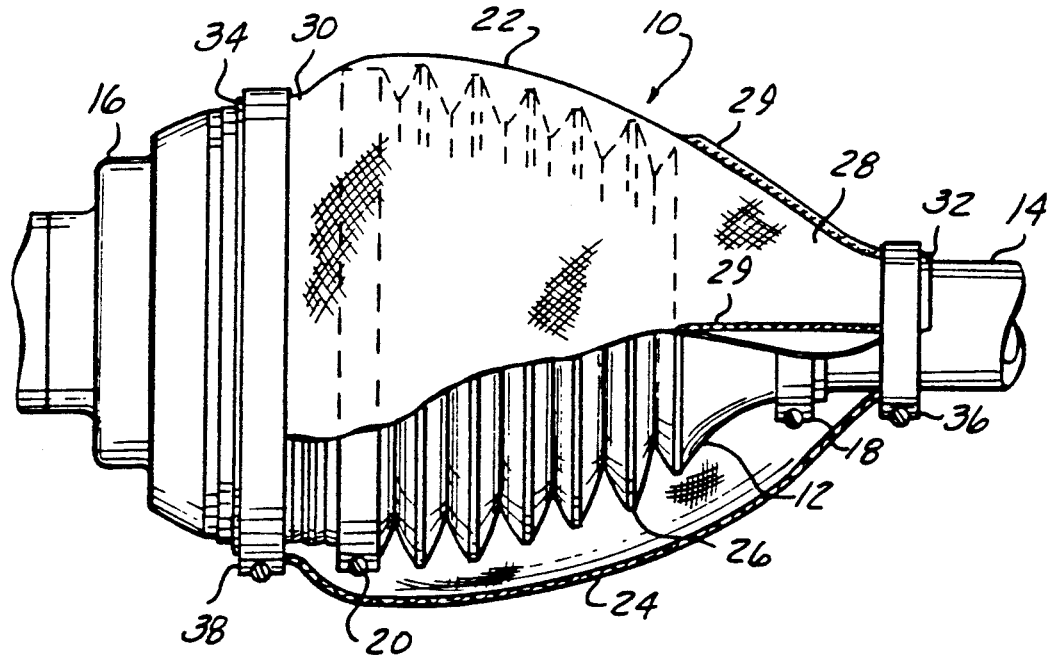

ABRASION-RESISTANT PROTECTIVE COVER

BACKGROUND OF THE INVENTION

I. Field of the Invention

The present invention relates to drive axle joint seals. More particularly, the present invention relates to a cover for extending the operation of a drive axle joint seal.

II. Description of the Relevant Art

Generally, drive axles of a vehicle are completely flexible assemblies consisting of an inner joint and an outer joint connected by an axle shaft. The inner joint is completely flexible and has the capability of in and out movement. The outer joint is also flexible, but cannot move in and out.

In order to protect these drive axle joints, a seal or "boot" is provided about the joint to ensure that the joint will stay lubricated during normal use of the vehicle. The boot is generally formed of silicone, neoprene rubber or thermoplastic material. The boot is flexible in all directions and comprises a bellows-like profile to allow the drive axle joint to flex in and out or freely rotate about the joint's central axis.

The boot is placed over the joint and connected to the joint casing at one end and the axle shaft at the opposite end. This connection is usually made by a ring clamp or other well known means of attachment. The point of attachment creates a seal between the boot and the joint, thus creating a protective area surrounding the drive axle joint that prevents joint lubrication, such as grease, from escaping the joint area and protecting the axle joint from atmospheric conditions. The sealed ends of the boot prevent the lubricating material from escaping the joint area.

Although the sealed boot prevents the joint area from drying up, the exterior of the boot is subject to excessive wear and tear. Specifically, both inner and outer joint boots may be subject to abrasive action encountered from substantial road deposits which build up on adjacent suspension components. Further, off-road driving by recreational and/or commercial vehicles, such as four-wheel drive vehicles, subject the boots to more subversive circumstances that may cause great wear and tear on the outer shell of the boot.

Further, the use of a non-resistant material, such as silicone, neoprene rubber or thermoplastic, to form the boot does not aid in guarding the boot against such wear and tear. A boot protector would, therefore, be advantageous in resisting such abrasion on the boot and extend the range of operation and the life of the boot itself.

SUMMARY OF THE INVENTION

The present invention provides an abrasion-resistant cover or "sock" for use in conjunction with a drive axle joint seal to prevent the seal exterior from breaking down due to extended subjection to abrasive materials.

The abrasion-resistant cover of the present invention is generally formed of one-piece construction and comprises separate clamping means for clamping the cover around the joint seal.

The cover is fitted over the seal like a sock and is comprised of abrasion-resistant material, such as a polyamide fiber or a polytetrafluoroethylene (P.T.F.E.) plastic material. Such materials are known by their trade names, Kevlar or Teflon, respectively, manufactured by DuPont. Other materials having similar properties which may be used to fabricate the sock cover are Cordura, also manufactured by DuPont, and Spectra, manufactured by Allied Signal. These materials may be used singularly or co-woven in combination to produce an abrasion-resistant material to protect the drive axle joint seal.

Specifically, the sock of the present invention may be applied during assembly of the drive axle joint seal in an assembly line setting or, if desired, in the aftermarket application by individual owner. This factory installed sock may be a sock which fits loosely about the joint seal to allow for rotational and flex "angular" movement of the joint about the axle. The material used to fabricate the sock may include a latex, thereby allowing the sock to be fitted tightly around the seal and comprising enough elasticity in the material to allow the joint and seal to bend freely.

The sock may also be provided with a seamed embodiment which may be applied to the seal after assembly by the individual owner of the vehicle. The seamed sock comprises an elongate rectilinear material which may be wrapped about the seal and attached to the seal and the axle shaft by adjustable clamping means. The ends of the sock overlap to prevent any abrasive material from entering the seamed area. Further, the seamed sock is more readily removable and replaceable with a new sock, if necessary, as no disassembly of the drive axle joint is required.

By providing a flexible, abrasion-resistant material in the form of a sock, the drive axle joint seal is protected from abrasion and normal everyday wear and tear.

Other advantages and features of the present invention will become more apparent from the following detailed description, when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which:

FIG. 1 is a cut-away side view of a drive axle joint including a preferred embodiment of the present invention;

FIG. 2 is a perspective view illustrating a first preferred embodiment of the present invention;

FIG. 3 is a perspective view illustrating a second preferred embodiment of the present invention;

FIG. 4 is a cross-sectional view showing a preferred method of fabrication of the present invention; and FIG. 5 is a cross-sectional view illustrating a third preferred embodiment of the present invention.

DESCRIPTION OF THE PREFERRED EMBODIMENTS

With reference first to FIG. 1, a first preferred embodiment of the sock 10 of the present invention is there shown partially cut away to show a joint seal 12 encased by the sock 10.

The joint seal 12 is fixedly attached to a drive axle shaft 14 at one end and a joint 16 at its other end. Clamping means 18, 20 are used to clamp the joint seal 12 about the drive axle assembly at 14, 16.

Sock 10 comprises a housing 22 having an expanded central area 24 of uniform profile which fits loosely about the tapered bellows area 26 of the joint seal 12. This allows the sock 10 to move relative to the joint seal 12 during rotation and bending of the drive axle shaft 14 relative to joint 16.

Housing 22 tapers inwardly toward each end 28, 30 and has an opening 32, 34 at each end 28, 30 for seating the sock 10 about the drive axle shaft 14 in joint 16, respectively. Sock 10 is attached to the drive axle shaft 14 and joint 16 by clamping means 36, 38, such as a ring clamp or any other releasable clamping means well known in the art. Other clamping means, such as pockets 46, 48 may be pre-fabricated to sock 10 to support clamps 36, 38 in position.

With reference to FIG. 2, a first preferred embodiment of the sock 10 is there shown having a housing 22 with an expanded central area 24 and tapered ends or necks 28, 30. In this first preferred embodiment, the sock 10 is formed of abrasion-resistant material and comprises a unitary piece having multiple partial seams 29 at the neck 28. The seams 29 facilitate the manufacture of the neck 28 from a material having a uniform cross section.

This sock 10 is preferably used for installation during assembly of the drive axle shaft 14 and joint 16. Therefore, in an assembly line setting, the sock 10 of the present invention would be pre-assembled about the joint seal 12 during assembly of a vehicle. The sock could be installed on the drive axle shaft 14 and joint 16 after manufacture.

The sock 10 may be formed of abrasion-resistant material, such as latex, polyamide fiber or polytetrafluoroethylene (P.T.F.E.) plastic material, or any combination of the above. Specifically, materials which may be used to fabricate the sock 10 are known by their trade names, Cordura, Kevlar and Teflon, manufactured by DuPont, and Spectra, manufactured by Allied Signal. The sock 10 may be manufactured solely from one of the above-stated materials or comprise a menagerie of all of the above, and formed by co-weaving the different materials into the preferred shape shown in FIG. 2.

The sock 10 may also be fabricated out of an elastomer or a material containing flexible characteristics to aid in the ability of the sock 10 to flex with the joint 16. Preferably, the sock 10 would be formed of a latex or neoprene material and would fit tightly about the bellows area 26 of the joint seal 12. Due to the flexing characteristic of the material, the sock 10 would fit snugly around the joint seal 12 and eliminate the need for excess material, such as the expanded central area 24.

With reference now to FIG. 4, a cross-sectional view of the sock 10 is there shown. In this embodiment, the sock is formed of abrasion-resistant material that has been fabricated by layering or orientating three different materials comprising different properties to aid in resisting abrasion. Specifically, the outer layer 40 would comprise a strong abrasion-resistant material, such as Cordura by DuPont, on top of a central layer 42 formed of Kevlar or Spectra, manufactured by DuPont and Allied Signal, respectively. Inner layer 44 is preferably formed of Teflon material, manufactured by DuPont, and comprising the characteristic of aiding in lubricating the outer periphery of the joint seal 12. If the sock 10 is fabricated in such a manner, as shown in FIG. 4, then the sock 10 will have a seam construction, as shown in FIG. 3.

With reference now to FIG. 3, a second preferred embodiment of the sock 50 is there shown having a seamed construction. Sock 50 comprises an elongate housing 52 substantially rectangular in shape for enclosing joint seal 12 within the sock 50. The split sock 50 may be used after assembly of the drive axle shaft 14 with the joint 16 as it is simply wrapped around the joint seal 12 and clamped in place by similar clamping means 36, 38, as shown in FIG. 1. Inner edge 54 is placed against joint seal 12. Outer edge 56 is then wrapped about the joint seal 12 loosely, if the abrasion-resistant material is of denser quality and holds its shape, or tightly if the abrasion-resistant material is flexible. Outer edge 56 overlaps inner edge 54 closing off any open areas which may allow material, such as rocks, to flow into the joint seal area. An appropriate means may be used to secure the edges 54 and 56 such as an adhesive or mechanical attachment, such as staple 55, shown in FIG. 3.

Split sock 50 may be fabricated from any of the above-mentioned material and is particularly advantageous in that it is removable and replaceable about the joint seal 12 without having to disassemble the drive axle shaft 14 or the joint 16.

With reference now to FIG. 5, a cross-sectional view of sock 10 is there shown having a plurality of perforations 58. Perforations 58 may be necessary in the fabrication of the sock 10 to allow drainage of the area between the sock 10 and the joint seal 12. If it is not desirable to have perforations 58 in the sock 10, split sock 50 may accomplish the desired effect of positive drainage by wrapping outer edge 56 about inner edge 54 along the bias of the material. This aids in allowing the material to flex during rotation of the joint seal 12 while allowing condensation to drain through the overlapped area. Further, sock 50 may simply be wrapped loosely about the joint seal 12 without overlapping outer edge 56 about inner edge 54. In this way, an area is left open for positive draining.

The sock of the present invention extends the range of operation of the joint seal by enhancing the joint seal's abrasion-resistant capabilities. Further, socks formed of different co-weaves or fabrications of several abrasion-resistant materials may be used on inner joints or outer joints of the drive axle depending on the subjection of each joint seal to the atmosphere.

Further, the use of a split sock is helpful in that it is readily removable and replaceable when necessary. Different socks, having different abrasion-resistant materials, may be needed on an off-road vehicle and can easily be installed about the joint seal by the split sock.

It should also be noted that other forms of fabrication well known in the art, such as knitting, braiding or weaving the sock, cutting it in a mold to the desired configuration, and blocking the sock on a mandrel, prevent the sock from shrinking about the joint when it is exposed to water, and thus eliminating the possibility of restricting movement of the joint by a tight, non-elastic sock.

Having described our invention, however, many modifications thereto will become apparent to those skilled in the art to which it pertains without deviation from the spirit of the invention as defined by the scope of the appended claims.

We claim:

1. In a motor vehicle having at least one mechanical joint connecting a drive axle shaft and a joint housing, wherein said drive axle shaft and joint housing are movable relative to one another during normal use and said at least one mechanical joint is enclosed within at least one elongated boot connected at one end to the drive axle shaft and connected at another end to the joint housing, the improvement of an abrasion-resistant sock comprising:

an elongated enclosure generally complementary to a shape of the at least one elongated boot and enclosing the at least one elongated boot, the enclosure having first and second surfaces defining apertures respectively the drive axle shaft and joint housing, the enclosure having an outer abrasion-resistant layer, a central layer and an inner lubricating layer facing the at least one elongated boot; and releasable attaching means for clamping the first and second surfaces defining apertures of the elongated enclosure to the drive axle shaft and joint housing respectively and spaced axially outwardly from corresponding ends of the at least one elongated boot.

2. The sock of claim 1 further comprising:

the elongated enclosure formed of flexible fabric material loosely draped about the at least one elongated boot allowing unfettered normal movement of the drive axle shaft and the joint housing relative to one another during use of the motor vehicle.

3. The sock of claim 1 further comprising:

means defining an opening extending from a first end of the elongated enclosure longitudinally to a second end of the elongated enclosure allowing installation of the elongated enclosure over the at least one elongated boot in a radial direction with respect to the drive axle shaft and joint housing.

4. The sock of claim 1 further comprising:

the elongated enclosure generally conforming the an exterior contour of the at least one elongated boot.

5. In a motor vehicle having at least one mechanical joint connecting a drive axle shaft and joint housing, wherein the drive axle shaft and joint housing are movable relative to one another during normal use and the at least one mechanical joint is enclosed within at least one elongated boot connected at one end to the drive axle shaft and connected at another end to the joint housing, the improvement of an abrasion-resistant sock comprising:

an elongated enclosure formed of a flexible fabric material loosely draped about the at least one mechanical joint enclosed by the at least one elongated boot allowing unfettered normal movement of the drive axle shaft and joint housing relative to one another during use of the motor vehicle, the elongated enclosure generally conforming to an exterior contour of the at least one mechanical joint enclosed by the at least one elongated boot and generally complementary to a shape of the at least one mechanical joint enclosed by the at least one elongated boot, the elongated enclosure the at least one elongated boot and having first and second surfaces defining apertures respectively engaging the drive axle shaft and the joint housing, the elongated enclosure including means defining an opening extending from a first end of the elongated enclosure longitudinally to a second end of the elongated enclosure allowing installation of the elongated enclosure over the at least one elongated boot in a radial direction with respect to the drive axle shaft and joint housing, the elongated enclosure having an outer abrasion-resistant layer, a central layer and an inner lubricating layer facing the at least one elongated boot; and releasable attaching means for clamping the first and second surfaces defining apertures of the elongated enclosure to the drive axle shaft and joint housing respectively and spaced axially outwardly from corresponding ends of the at least one elongated boot.

* * * * *

UNITED STATES PATENT AND TRADEMARK OFFICE
CERTIFICATE OF CORRECTION

PATENT NO.  : 5,273,490
DATED       : December 28, 1993
INVENTOR(S) : Todd B. Stewart It is certified that error appears in the above-indentified patent and that said Letters Patent is hereby corrected as shown below:

In the Drawings:
Add the figs. 1-5 as shown on the attached pages.

Signed and Sealed this

Fourteenth Day of November, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,273,490

DATED : December 28, 1993

INVENTOR(S) : Todd B. Stewart

Page 2 of 3

It is certified that error appears in the above-indentified patent and that said Letters Patent is hereby corrected as shown below:

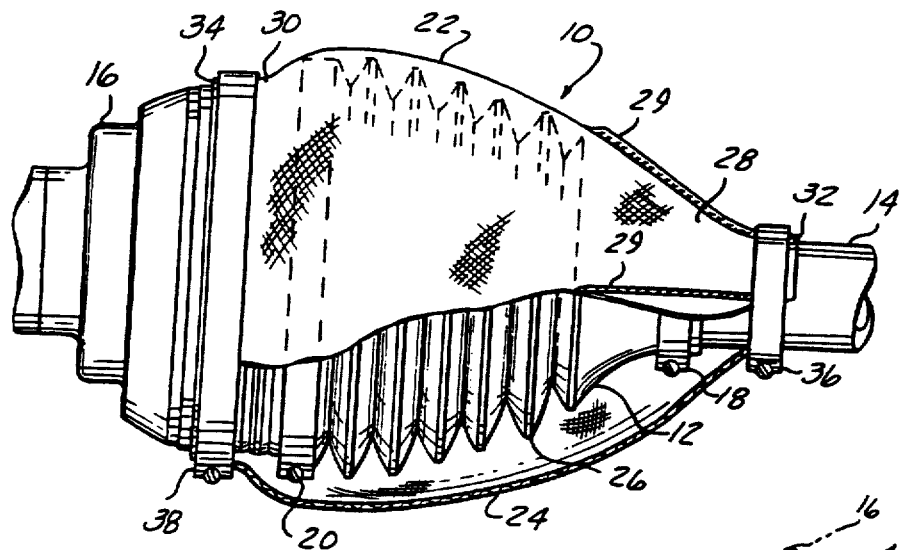

FIG-1

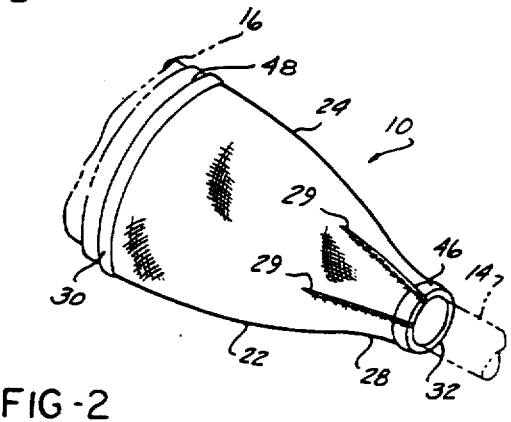

FIG-2

UNITED STATES PATENT AND TRADEMARK OFFICE
CERTIFICATE OF CORRECTION

PATENT NO. : 5,273,490
DATED : December 28, 1993
INVENTOR(S) : Todd B. Stewart

It is certified that error appears in the above-indentified patent and that said Letters Patent is hereby corrected as shown below:

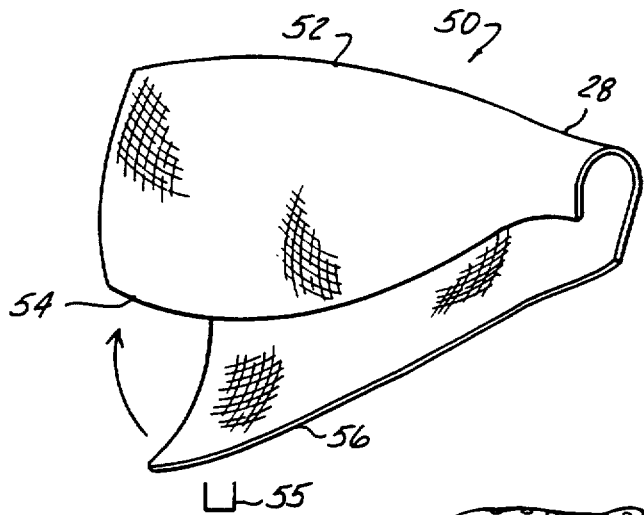

FIG-3

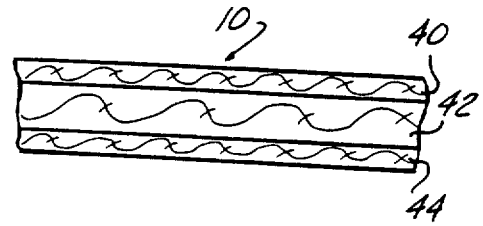

FIG-4

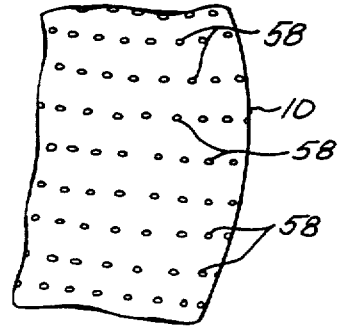

FIG-5